US011269789B2

(12) United States Patent
Vempaty et al.

(10) Patent No.: US 11,269,789 B2
(45) Date of Patent: Mar. 8, 2022

(54) MANAGING CONNECTIONS OF INPUT AND OUTPUT DEVICES IN A PHYSICAL ROOM

(71) Applicant: Xio Research, Inc., Nyack, NY (US)

(72) Inventors: Aditya Vempaty, Yorktown Heights, NY (US); Robert Smith, New York, NY (US); Shom Ponoth, Irvine, CA (US); Sharad Sundararajan, Union City, CA (US); Ravindranath Kokku, Yorktown Heights, NY (US); Robert Hutter, Burlingame, CA (US); Satya Nitta, Cross River, NY (US)

(73) Assignee: MERLYN MIND, INC., New York, NY (US)

( * ) Notice: Subject to any disclaimer, the term of this patent is extended or adjusted under 35 U.S.C. 154(b) by 0 days.

(21) Appl. No.: 17/091,407

(22) Filed: Nov. 6, 2020

(65) Prior Publication Data
US 2021/0056046 A1 Feb. 25, 2021

Related U.S. Application Data

(63) Continuation of application No. 16/396,622, filed on Apr. 26, 2019, now Pat. No. 10,838,881.

(51) Int. Cl.
*G06F 13/10* (2006.01)
(52) U.S. Cl.
CPC .......... *G06F 13/10* (2013.01); *G06F 2213/38* (2013.01)

(58) Field of Classification Search
CPC .......... G06F 15/177; G06F 13/10; G09G 5/00
See application file for complete search history.

(56) References Cited

U.S. PATENT DOCUMENTS

| | | |
|---|---|---|
| 2004/0210159 A1 | 10/2004 | Kibar |
| 2005/0246165 A1 | 11/2005 | Pettinelli |
| 2013/0304641 A1 | 11/2013 | Dabbiere |
| 2014/0212854 A1 | 7/2014 | Divakaran |
| 2015/0243175 A1 | 8/2015 | Raman |
| 2016/0203699 A1 | 7/2016 | Mulhem |
| 2016/0293024 A1 | 10/2016 | Kozloski |
| 2017/0127021 A1 | 5/2017 | Frank |
| 2017/0206793 A1 | 7/2017 | Flaherty |
| 2017/0352285 A1 | 12/2017 | Selen |
| 2020/0211406 A1 | 7/2020 | Kokku |
| 2020/0341912 A1 | 10/2020 | Vempaty |

*Primary Examiner* — Getente A Yimer
(74) *Attorney, Agent, or Firm* — Hickman Becker Bingham Ledesma LLP

(57) ABSTRACT

A device management server computer ("server") and processing methods are disclosed. In some embodiments, the server is programmed to manage a plurality of input devices and output devices in a physical room. The server is programmed to analyze media data capturing actions performed by a user in real time as a participant in the physical room, determine how the user would like to connect at least one of the input devices and one of the output devices from the analysis, and enable the connection. The sever is programmed to interpret the actions and derive commands for connecting two or more devices based on predetermined data regarding the input devices and output devices and rules for referring to and connecting these devices.

18 Claims, 6 Drawing Sheets

US 11,269,789 B2

MANAGING CONNECTIONS OF INPUT AND OUTPUT DEVICES IN A PHYSICAL ROOM

BENEFIT CLAIM

This application claims the benefit under 35 U.S.C. § 120 as a Continuation of application Ser. No. 16/396,622, filed Apr. 26, 2019, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

One technical field of the present disclosure is facilitating and enhancing user physical activities through digital user interfaces. Another technical field is real-time, intelligent processing and transmission of multimedia communications related to various input and output devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, computer devices are enabled to regularly interact with humans. Typically, such devices are designed to satisfy individual needs or facilitate user online activities. It would be helpful to have more advanced devices for managing activities collaboratively performed by multiple participants in a physical room, to enhance communication among the participants and engagement with the physical room and provide smooth and enriched user experience to the participants.

DETAILED DESCRIPTION

Figure 1:
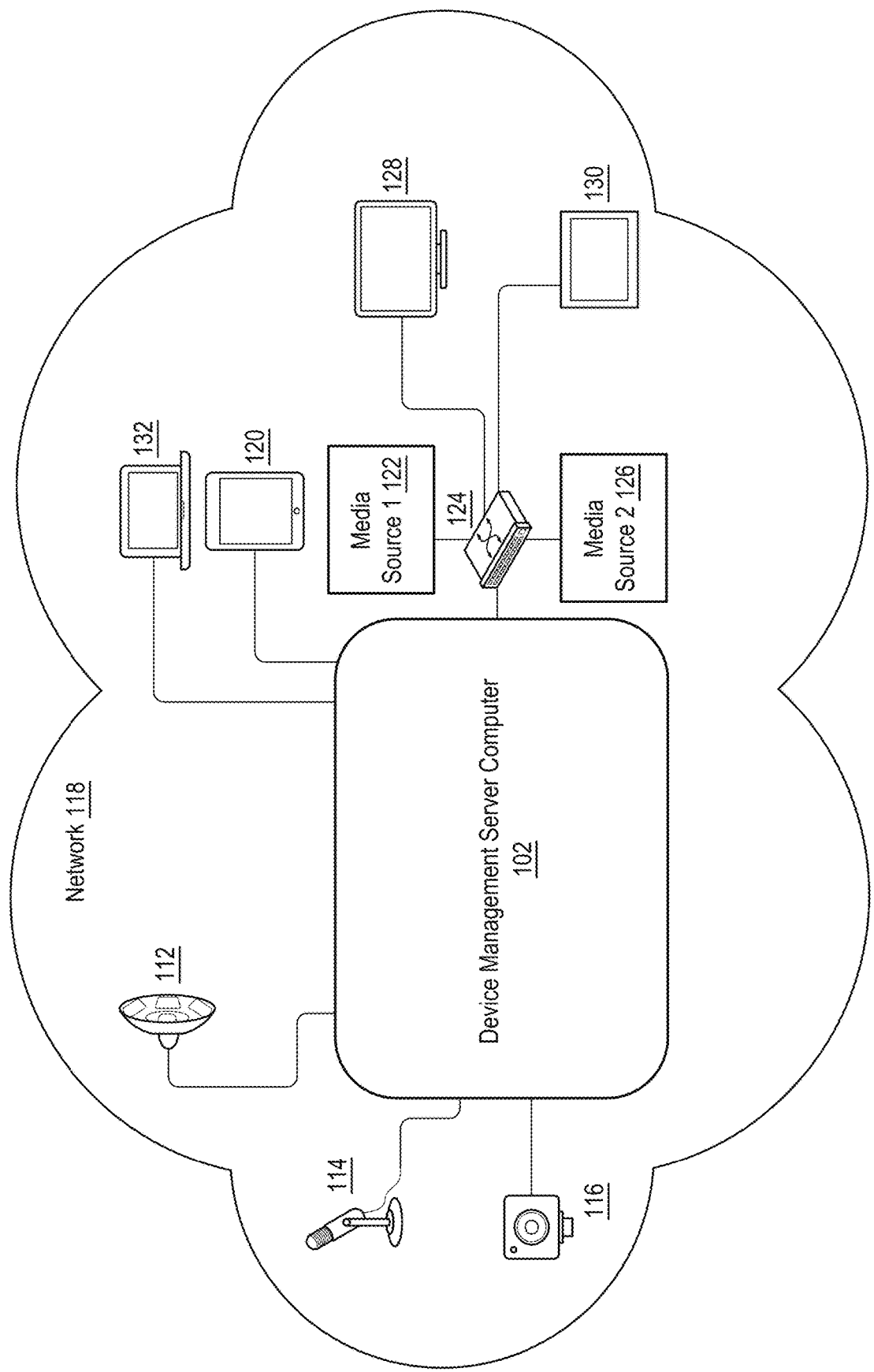
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
  4.1. CONFIGURING DEVICE MANAGEMENT
  4.2. IMPLEMENTING DEVICE MANAGEMENT
5. EXAMPLE PROCESSES
6. HARDWARE IMPLEMENTATION
7. EXTENSIONS AND ALTERNATIVES

1. General Overview

A device management server computer ("server") and processing methods are disclosed. In some embodiments, the server is programmed to manage a plurality of input devices and output devices in a physical room. The server is programmed to analyze media data capturing actions performed by a user in real time as a participant in the physical room, determine how the user would like to connect at least one of the input devices and one of the output devices from the analysis, and enable the connection. The sever is programmed to interpret the actions and derive commands for connecting two or more devices based on predetermined data regarding the input devices and output devices and rules for referring to and connecting these devices.

In some embodiments, the server is configured to manage a group of input devices and a group of output devices located in a physical room. Different input or output (I/O) devices have distinct features, capable of handling different types of data or connecting with different devices. Not all the I/O devices in the physical room need to be turned on all the time. It would be helpful to enable or facilitate the turning on, off, up, or down of these I/O devices and the connection of the I/O devices based on the needs or preferences of the participants in the physical room.

In some embodiments, the server is configured to obtain device data related to the I/O devices. For example, the device data can indicate that the input devices of a zoom-and-point camera, a handheld microphone, and a wireless keyboard can be referred to by the words of "zoom", 'mic", and "keys" respectively, and the output devices of a laptop monitor, a home theater projector, and a portable speaker can be referred to by the words of "out1", "out2", and "out3", respectively. The device data can also indicate that specific I/O devices can be referred to by specific sounds, icons, drawings, or gestures. The server may also be configured to further obtain connection data related to the connection of I/O devices. For example, the connection data can indicate that a connection can be specified by the word(s) of "connect" or "hook up" (these two I/O devices) or the gesture of bringing two palms together. For further example, the connection data can also indicate that an existing connection can be modified by the word(s) of "switch" or "replace" (an I/O device in a connection to/by another I/O device) or the gesture of one left waiving from one side to the other. Similarly, the connection data can also indicate that a connection can be specified by specific sounds, icons, drawings, or gestures, In some embodiments, the server is programmed to continuously identify a user action from data produced by the input devices and infer a command for connecting an input device and an output device. For example, when the user action includes the gesture of bringing two palms together and the spoken words of "zoom and out2", a user command of connecting the camera and the projector can be inferred. When the user action includes the spoken words of "hook the camera up" and the gesture of placing one hand on the monitor and the other hand on the projector, the server can be programmed to cause connection of the camera with at least one of the monitor and the projector based on predetermined rules or further user input. When the user action includes the spoken word of "connect" and the gesture of one hand pointing in the direction of the microphone, the server can be programmed to determine that the user is pointing at the microphone and that the speaker is the only device in the physical room that is compatible with the microphone, and cause connection of the microphone and the speaker. When the user action includes the spoken word of "keys" and the spoken words of "the largest display", the server can be configured to determine that the largest display in the physical room is the projector and that the projector can be connected with the keyboard, and cause connection of the keyboard and the projector.

The server offers several technical benefits and improvements over past approaches. The server enables automatic management of I/O devices in a physical room. The server also offers an effective and friendly user interface that allows a participant in the physical room to efficiently instruct the connection of at least one input device and at least one output device. The ability to accurately interpret a user action and in turn infer a user command to connect two I/O devices enables a fast connection that reduces the chance of either of the I/O devices standing idle alone without contributing to the activities in the physical room. In addition, by properly and effectively connecting the various I/O devices, the server enables real-time, multi-sensory communication and enhances interactive user experience in the physical room. Furthermore, by being located in the physical room as the I/O devices, the server helps conserve network resource utilization and reduce response time, as computation and interaction with the I/O devices generally takes place directly in the physical room.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a device management server computer 102 ("server") and an I/O system, including one or more integrated devices 132 and 120 which integrate input and output capabilities, a media switch 124, one or more input devices 114, 116, 122, and 126, and one or more output devices 112, 128, and 130. The server can be communicatively coupled with each component of the I/O system via one or more networks 118 or cables, wires, or other physical components.

In some embodiments, the server 102 broadly represents one or more computers, virtual computing instances, and/or instances of a server-based application that is programmed or configured with data structures and/or database records that are arranged to host or execute functions including but not limited to managing the I/O system, including connecting or disconnecting the I/O devices to enable communication of data inputted by the input devices to be outputted by the output devices. In certain embodiments, the server 102 can comprise a controller that provides a hardware interface for one or more components in the I/O system. For example, the server 102 can have an audio controller that communicates with I/O devices that handle audio data or a camera controller that specifically communicates with a camera. The server 102 is generally located in the physical room to help achieve real-time response.

In some embodiments, the I/O system can comprise any number of input devices, output devices, or media switches. An input device typically includes a sensor to receive data, such as a keyboard to receive tactile signals, a camera to receive visual signals, or a microphone to receive auditory signals. Generally, there can be a sensor to capture or measure any physical attribute of any portion of the physical room. Additional examples of a physical attribute include smell, temperature, or pressure. There can also be sensors to receive external signals, such as a navigation device to receive satellite GPS signals, a radio antenna to receive radio signals, or a set-top box to receive television signals. These sensors do not normally receive signals generated by a user but may still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Example of an integrated device include a desktop computer, laptop computer, tablet computer, smartphone, or wearable device. A media switch typically comprises a plurality of ports into which media devices can be plugged. The media switch is configured to then re-direct data communicated by media sources to output channels, thus "turning on" or "activating" connections with specific output devices in accordance with instructions from the server 102. In general, one or more of the input devices can be selected to capture participant actions in addition to or instead of other activities in the physical room. The selected input devices can be dedicated to such use or can concurrently capture other activities in the physical room. For example, the microphone capturing spoken words from a participant can be connected with a speaker to broadcast the spoken words, and the microphone can also capture other sounds made in the physical room.

In this example, the media switch 124 can comprise many ports for connecting multiple media and I/O devices. The media switch 124 can support a standard interface for media transmission, such as HDMI. The media devices 122 and 126 communicating with the media switch 124 can be video sources. The server 102 can serve as an intermediary media source to the media switch 124 by converting data received from certain input devices to a format compatible with the communication interface supported by the media switch 124. The media devices 128 and 130 communicating with the media switch 124 can include a digital audio device or a video projector, which may be similar to other output devices but being specifically compatible with the communication interface supported by the media switch 124. The additional input devices 114 and 116 can be a microphone and a camera. The integrated devices 132 and 120 can be a laptop computer and a mobile phone. The server 102 and the components of the I/O system can be specifically arranged in the physical room to maximize the communication efficiency and overall performance.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to continuously receive data regarding what is happening in the physical room from the input devices, such as the input devices 114 and 116. The server 102 is programmed to then identify and interpret an action by a participant in the physical room from the data and infer a command for connecting one of the input devices (which may include integrated device or a media device herein) and one of the output devices (which may include an integrated device herein). Based on the inferred command, the server 102 is programmed to directly transmit a part of the data generated by the one input device, such as the input device 116, to the one output device, such as the integrated device 132, or send an instruction to the media switch 124 to connect the one input device, such as the media device 122, to the one output device, such as the output device 128. The server 102 can also be programmed to turn on, off, up, or down any of the I/O devices or connect additional I/O devices based on the inferred command.

3. Example Computer Components

Figure 2:
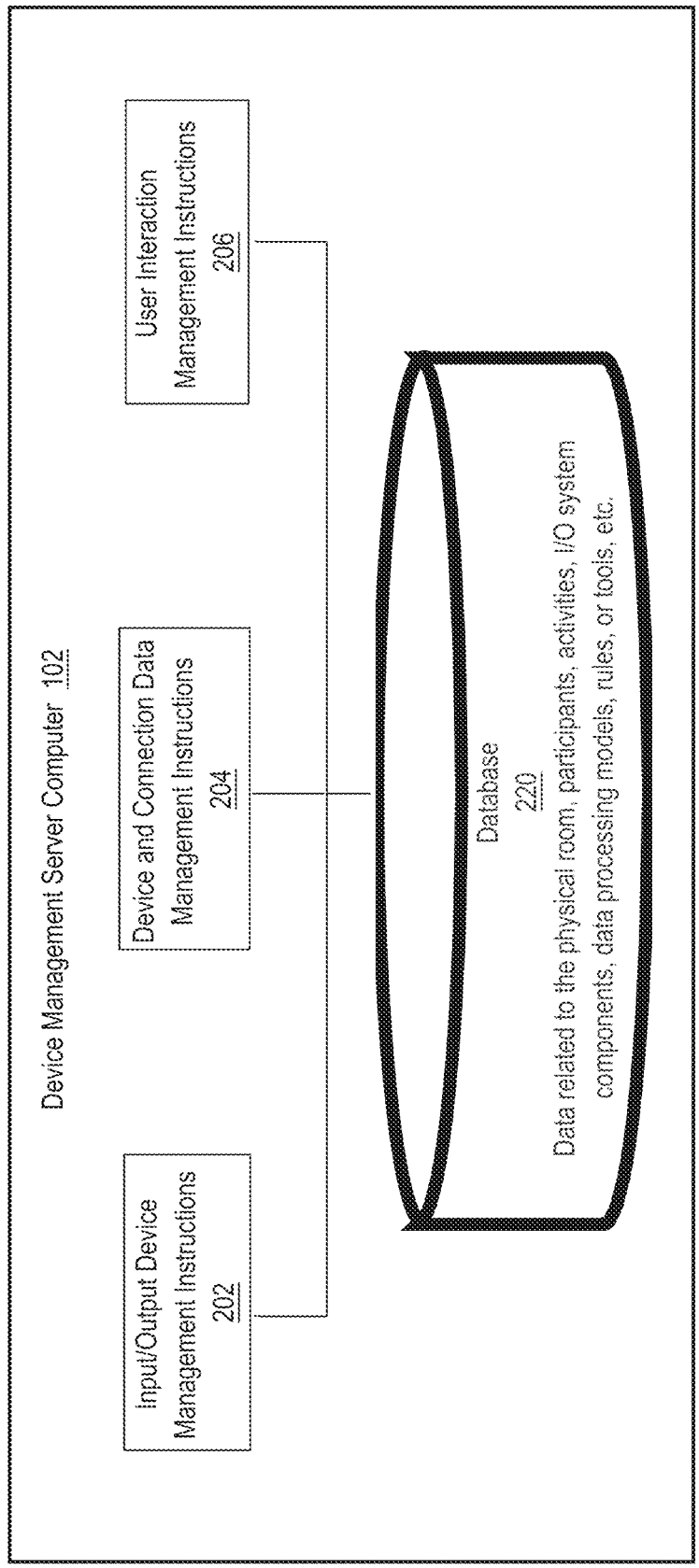
FIG. 2 illustrates example computer components of a device management server computer in accordance with the disclosed embodiments.

FIG. 2 illustrates example components of the device management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise input/output device management instructions 202, device and connection data management instructions 204, and user interaction management instructions 206. In addition, the server 102 can comprise a database 220.

In some embodiments, the input/output device management instructions 202 enable management of and communication with various input devices, output devices, integrated devices, media devices, or media switches. The management may include turning on or shutting off an I/O device, adjusting the sensitivity of an input device, adjusting the intensity of an output device, or connecting multiple input and/or output devices (which may include integrate devices or media devices herein). The communication can include receiving data regarding what is happening in the physical room and conveying the process or result of analyzing the received data back to the physical room.

In some embodiments, the device and connection data management instructions 204 enable management of data regarding the I/O system components, including vendor-provided technical data of the input devices and output devices or user-provided specifications or preferences. Such data enable the understanding of references to the I/O system components and requests for connecting some of the I/O system components. The management may include soliciting relevant data from device vendors or users and storing them in a storage device. The management may also include automatically extracting identification, type, or other important features of the I/O system components from the vendor-provided data. In addition, the management may include automatically generating certain data for referring to or ranking the I/O system components from the vendor-provided data.

In some embodiments, the user interaction management instructions 206 enable management of user interaction, which can involve user actions that correspond to requests to connect I/O devices or replies to the requests based on relevant data produced by the connected I/O devices. The management may include identifying and interpreting a user action as captured by the input devices, such as one or more written or spoken words, drawn figures, or gestures. The management may further include inferring a command for connecting two I/O devices using existing text, speech, or image analysis techniques or relying on additional data captured by the input devices or predetermined data or rules. In addition, the management may include determining how to implement the command by considering which data to transmit and where to transmit such data.

In some embodiments, the database 220 is programmed or configured to manage relevant data structures and store relevant data for functions performed by the server 102. The relevant data may include data related to the physical room, participants, activities, I/O system components, data processing models or tools, and so on. The data related to the I/O system components in particular can include handles or mechanisms for the system components, indications for connecting the I/O system components, or various rules for selecting or applying these handles, mechanisms, or indications, as further discussed below.

4. Functional Descriptions

4.1. Configuring Device Management

In some embodiments, the server 102 is programmed to receive a list of input devices and output devices to be used in a physical room. For example, the input devices can include a camera, a microphone, a keyboard for a computing device, or another sensor configured to detect and input sensory signals in real time. The output devices can include a speaker to produce auditory signals, a monitor to produce visual signals, a heater to produce heat, or another device configured to produce and output sensory signals in real time.

In some embodiments, the server 102 is programmed to determine various types of information regarding each of the list of I/O devices. The various types of information can be extracted from vendor-provided data, such as a name, a type (input or output), a category (e.g., sound, image), a capacity, a set of dimensions, a set of special features (e.g., showing colors, emphasizing bass), or a set of compatible devices of the opposite type. The extraction can include applying existing text analysis techniques, such as named-entity recognition, to user guides, manuals, technical specifications, data sheets, or public data related to each of the list of I/O devices. The various types of information can be created by users, such as a default compatible device, a set of collaborating devices of the same type, a default collaborating device, or a hierarchical rank. For example, a speaker and a monitor may often be used together to show video data and thus can be collaborating devices of each other. The hierarchical rank provides a hierarchical classification of the I/O devices and a rank within each class. For example, one class can correspond to all output devices, which may contain a first class corresponding to all speakers and a second class corresponding to all screens. The first class can be ranked before the second class, and a first speaker can also be ranked before a second speaker. Such ranking can also be automatically derived from the vendor-provided data. For example, the speakers in the first class can be ranked by default by the frequency response. The hierarchical ranking can be used to select a smaller set of I/O devices from a larger set of I/O devices, as further discussed below.

In some embodiments, the server 102 is programmed to determine specific handles for referring to each of the I/O devices. A handle is typically simple and intuitive and thus easy to remember or provide for a user in a physical room. A handle can be in one of various forms to be captured by various input devices. For example, for a SONY® headphone WH-CH700N, one handle can be the spoken word of "SONY" or "700" and another handle can be the gesture of putting on a headphone. The server 102 can be programmed to automatically create a handle for an I/O device, such as by selecting a word from the official name of the I/O device that occurs the least often across all such official names.

In some embodiments, the server 102 is programmed to determine specific mechanisms for referring to one of the I/O devices. Such a mechanism is generally not specific to a device but can be relative to a part of the physical room, such as a user, a corner of the physical room, or another I/O device. For example, the mechanism can simply be touching or speaking directly to a specific device. The mechanism can be speaking "the device in front of the team leader" or "the loudest device in the back of the physical room". In addition, the mechanism can also be a combination of less explicit commands, such as speaking "that device" and looking at an I/O device that is twenty feet away.

In some embodiments, the server 102 is programmed to initially compile a set of handles and mechanisms for referring to I/O devices and collect sufficient training data to recognize the use of any of the set of handles and mechanisms across a group of users or specific to a user. An existing text, speech, or image processing technique or a similar method known to someone skilled in the art can be used for the recognition task. The technique can generate a likelihood of success or a confidence score, which can be used to determine whether additional data is required or another technique should be used. For example, a convolutional neutral network (CNN) can be trained and applied to recognize the use of any of the set of handles and mechanisms. The CNN with a softmax function might return a probability of belonging to one of the particular classes, which can be used as an indication of the quality of the recognition.

In some embodiments, the server 102 is programmed to determine specific rules for automatically turning on or off an I/O device. Some basic rules can include turning on an I/O device that is the last operational I/O device of its type or turning off an I/O device after a certain time during a day. For example, an input device can remain on for a scheduled period when users are expected to be in the physical room in order to catch any input data from a user. For further example, when an output device fails, the only remaining output device or a default replacement output device can be automatically turned on. Additional rules can be created from the set of special features noted above. For example, when the input data includes colors, an output device that handles color signals instead of grayscale signals can be turned on. Additional rules can also be created to depend on what is happening in the physical room. The server 102 can be similarly configured to collect sufficient training data to recognize the application of any of such rules across a group of users or specific to a user. For example, the I/O device that is closest to where a majority of the participants in the physical room are located or looking at can be turned on. For further example, when a teacher or another specific user yells "Everyone be quiet" or "Everyone focus now", an I/O device can be turned off. Similar rules can be used for automatically adjusting the operational level of an I/O device.

In some embodiments, the server 102 is programmed to determine specific data for requesting a connection between two or more I/O devices to enable the data inputted by an input device to be outputted by an output device. The request may include a first portion that indicates a "connection" and a second portion that refers to two or more I/O devices. The first portion can correspond to a set of spoken words, gestures, sounds, or other signals. For example, such a spoken word can be "connect" or such a gesture can be bumping two fists together. Alternatively, the first portion can be inferred from a relationship between the two or more I/O devices. Specifically, when multiple I/O devices of different types are both referenced within a specific short period of time, a request to connect the multiple I/O devices can be inferred and the connection can be established. For example, a user could say "Use the camera and the desktop computer" or instead tap on the camera and the desktop computer near simultaneously. Furthermore, when multiple I/O devices are moved to be within a certain distance of one other or are turned to be directly facing one other, a request to connect the multiple I/O devices can be inferred and the connection can also be established.

In some embodiments, the server 102 is programmed to determine additional data for requesting a connection between two or more I/O devices. The additional data can include default rules for specifying one of the I/O devices to be connected. A default can be an I/O device that is currently turned on, that is the only one operational, that is the only one compatible to the other I/O device to be connected, that is one of the collaborating devices, that has the highest rank, that is closest to a majority of the users in the physical room, or that is most capable of handling the data being communicated. For example, a user can say "Connect this device" while holding a microphone, and the microphone can be automatically connected with one of the default output devices.

In some embodiments, the server 102 is programmed to determine a ranking of different approaches of referring to I/O devices or requesting for a connection of I/O devices. Such a ranking may be applied to determine how to analyze a user action or which of multiple user actions detected near simultaneously to analyze first. The server 102 can be configured to prioritize direct approaches over relative approaches. For example, an existing, explicit reference to an I/O device is preferred over an approach that requires inference or corroboration of other data, such as the spoken words of "the device in front of the teacher". The server 102 can also be configured to prioritize relative approaches over default rules or consider other schemes to rank different approaches. For example, the users or participants in the physical room might have been assigned different roles, and the references or requests made by users in certain roles may be given certain ranks. In addition, when the input devices have hierarchical ranks, as noted above, the references or requests captured by certain input devices can be given similar ranks.

In some embodiments, the server 102 is programmed to determine specific data for handling ambiguous references to I/O devices or requests for connecting I/O devices. The specific data can include an instruction to request clarification from the source of the reference or the request for connection. The request for clarification can depend on the nature of the ambiguity. For example, when a user's speech is unclear, such as when a speech recognition technique returns a confidence score that is below a certain threshold, the request for clarification can include choices of words that sound similar to the speech and have relevant meanings in the current context. When a user points in a certain direction and the I/O device being pointed at is unclear, the request for clarification can include choices of I/O devices located along that direction in the physical room. The specific data can also include some of the default rules discussed above to choose one I/O devices from several possible candidates.

Figure 3:
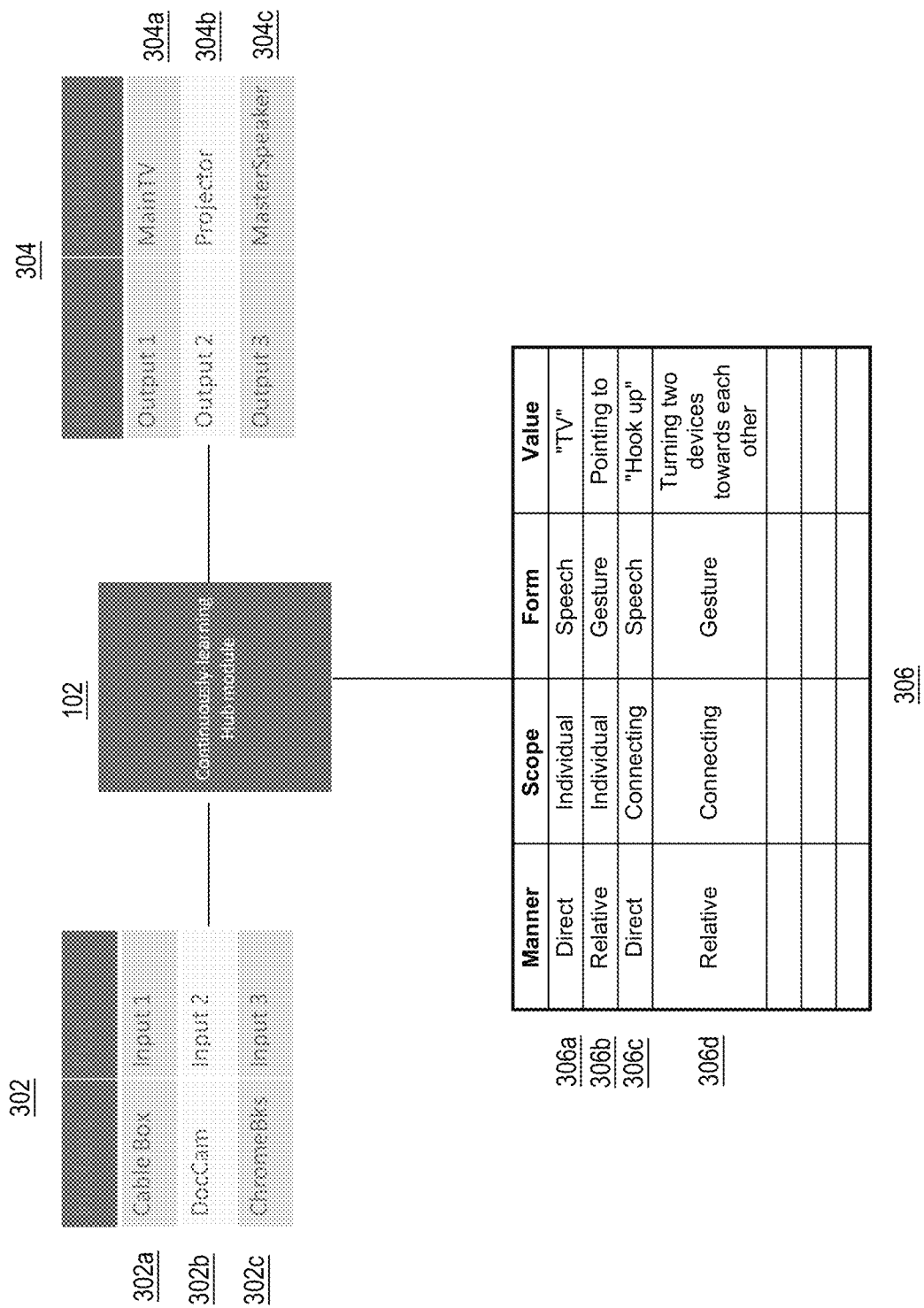
FIG. 3 illustrates an example database storing predetermined mappings and rules.

FIG. 3 illustrates an example database storing predetermined mappings and rules. In some embodiments, the server 102 is programmed to access a set of mappings for a media switch having various ports from the table 302 and the table 304. The set of mappings shows how the various ports are currently used by various I/O devices in the physical room. The table 302 contains mappings for input devices (which can include media devices), where the row 302*a* shows a mapping of the port "input 1" to a cable box (a set-top box), the row 302*b* shows a mapping of the port "input 2" to a document camera, and the row 302*c* shows a mapping of the port "input 3" to a laptop computer or specifically an input device integrated into the laptop. The table 304 contains mappings for output devices, where the row 304*a* shows that a mapping of the port "output 1" to a main TV, the row 304*b* shows a mapping of the port "output 2" to a projector, and the row 304*c* shows a mapping of the port "output 3" to a master speaker. The information used to refer to an I/O device in each mapping is preferably one of the handles for the I/O device so that the server 102 can be configured to, upon interpreting a user's use of a handle to refer to an I/O device, directly apply one of the set of mappings discussed above and formulate an instruction for the media switch that understands ports.

In some embodiments, the server 102 is further programed to access a set of rules for referring to individual devices or requesting for a connection of multiple I/O devices from the table 306. Each rule can have a "manner" component indicating that a rule contains a direct or relative reference or request, a "scope" component indicating whether the rule contains a reference applying to one I/O devices or a request applying to multiple I/O devices, a "form" component indicating the form of the rule, which may correspond to the type of media, and a "value" component indicating the value of the rule. The table 306 contains rules for certain I/O devices in the physical room, where the row 306*a* shows that a handle for a television is the spoken word of "TV", the row 306*b* shows that a mechanism for referring to an I/O device is pointing to the I/O device, the row 306*c* shows that a direct indication of a connection of two I/O devices comprises the spoken words of "Hook up", and the row 306*d* shows that a relative indication of a connection of two I/O devices comprises turning the two I/O devices towards each other.

4.2. Implementing Device Management

In some embodiments, the server 102 is programmed to turn on, off, up, or down or connect or disconnect various I/O devices in accordance with predetermined data or rules, as discussed in Section 4.1. The server 102 is programmed to dynamically determine whether to turn on, off, up, or down or connect or disconnect certain I/O devices from various types of data generated continuously by input devices further in accordance with predetermined rules, as discussed in Section 4.1. Specifically, the server 102 is configured to identify and interpret user actions and derive user commands from data produced by a microphone, a camera, a keyboard, a touch screen, or another input device using existing speech or image recognition techniques or similar methods based on existing training data. For example, the microphone can capture speech or other sounds, the camera can capture mouth movements, drawings, icons, or gestures, or the keyboard or a touch screen can capture words, drawings, or icons. For further example, the camera can capture a user drawing a device or pointing to an icon representing an I/O device on the blackboard, or the touch screen can capture a click on a digital icon representing an I/O device or a drawing of a digital line connecting two digital icons representing two I/O devices. The interpretation can include identifying references to I/O devices or requests for connecting I/O devices. The interpretation can include extracting multiple user demands and selecting for further processing one command that can be converted to a request to connect an input device and an output device.

In some embodiments, to interpret a user action and derive a user command, the server 102 is programmed to initially determine whether the user action includes an indication to connect I/O devices, such as the spoken word of "connect" or a corresponding gesture. When this initial determination returns a positive result, the server 102 can be programmed to identify the I/O devices to be connected, applying any default rule as necessary. When the initial determination returns a negative result, the server 102 can be programmed to next determine whether the user action includes references to at least two I/O devices that can be connected with one another.

In some embodiments, then this next determination returns a negative result, the server 102 is configured to conclude that any user command derived from the user action cannot be converted to a request to connect an input device and an output device. When this next determination returns a positive result, in response to further determining that the user action includes references to two I/O devices that can be connected only with each other, the server 102 is configured to cause connection of the two I/O devices. For example, even if the user action of tapping on an input device and a compatible output device nearly simultaneously does not include an explicit indication of a connection, a user command can be derived to connect the input device and the compatible output device. When this next determination returns a positive result, in response to further determining that the user action includes references to more than two I/O devices that can be connected, the server 102 is configured further determine how to connect the more than two I/O devices based on further user input or predetermined data or rules, as noted above.

Figure 4:
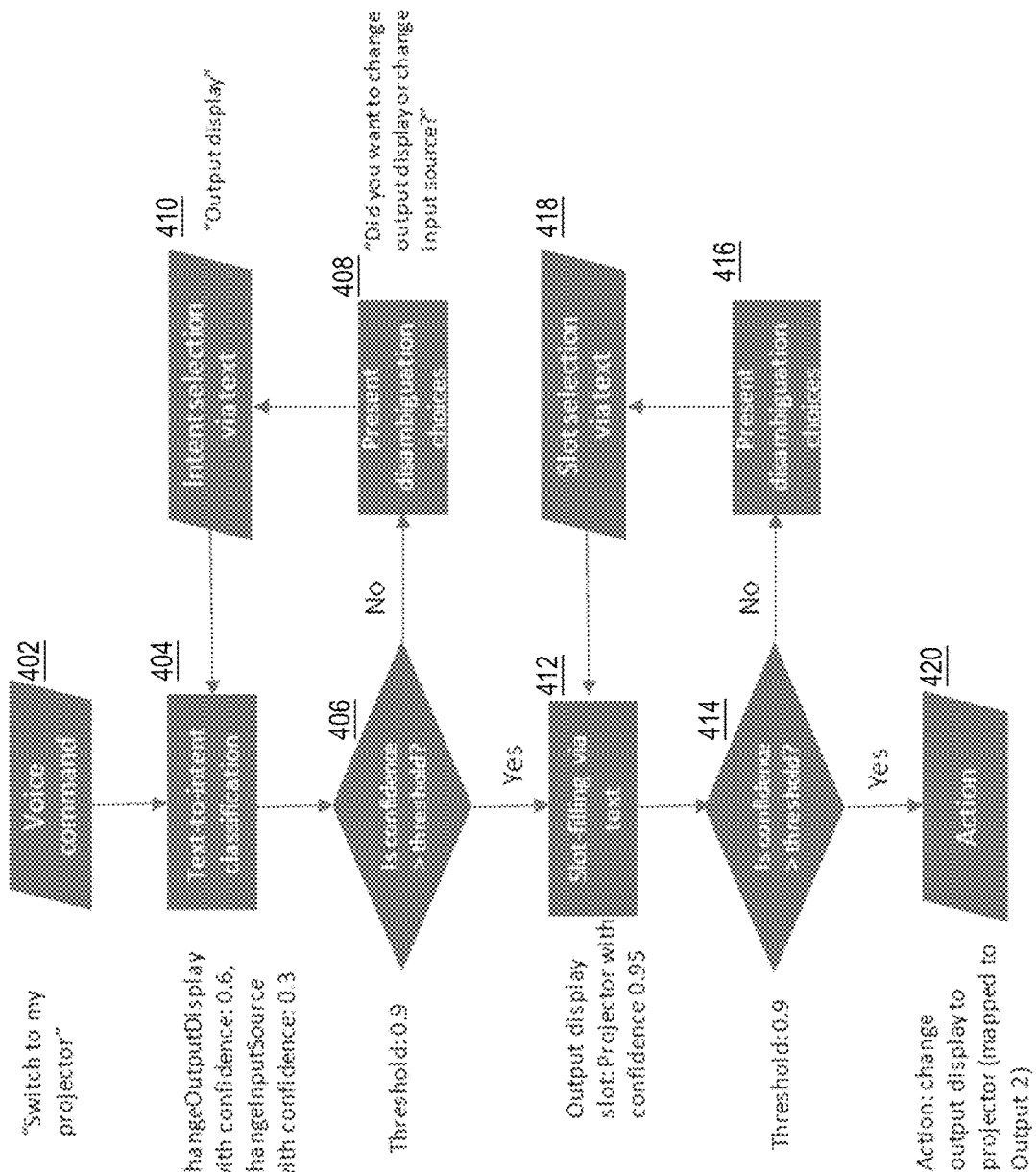
FIG. 4 illustrates an example process of disambiguating a user action to derive a user command.

FIG. 4 illustrates an example process of disambiguating a user action to derive a user command. In step 402, the server 102 is programmed to receive a speech corresponding to a voice command. For example, the speech can be "Switch to my projector". In step 404, the server 102 is programmed to extract an intent for input or output from the user speech underlying the user command using a speech analysis or processing technique, as noted above. For example, the technique can involve recognizing the word of "projector" and classifying it as an input source or an output display. The technique can return that the speech is recognized as "Change output display" with a confidence score of 0.6 for the intent and that the speech is recognized as "Change input source" with a confidence of 0.3 for the intent. In step 406, the server 102 is configured to determine whether any confidence score for the intent exceeds a first threshold. For example, the first threshold could be 0.9, which is not exceeded by either 0.6 or 0.3. In step 408, when no confidence score for the intent exceeds the first threshold, the server 102 is programmed to request additional user input. For example, a dropdown list of two choices corresponding to the two speech recognition results can be displayed. In step 410, the server 102 is programmed to receive additional user input. For example, a selection of the speech recognition result "Change output display" can be received. Step 404 is then repeated. For example, the selection of the speech recognition result "Change output display" can be easily recognized as "Change output display" with a confidence score of 0.95 for the intent, which exceeds 0.9. Step 406 is then repeated. In step 412, when a confidence score for the intent exceeds the first threshold, the server 102 is programmed to extract a value for an I/O device slot using a speech analysis or processing method. For example, the method can involve classifying the word of "projector" to one of the handles. The method can return that "projector" is recognized as the handle of the spoken word of "projector" with some confidence score for the I/O device slot. In step 414, the server 102 is configured to determine whether any confidence score for the I/O device slot exceeds a second threshold. When no confidence score for the I/O device slot exceeds the second threshold, steps 416, 418, and 412 can be similarly taken, as discussed above. When a confidence score for the I/O device slot exceeds the second threshold, in step 420, the server 102 is programmed to cause performance of the action instructed by the user command. For example, the user command can be to switch the output device that has a handle of the word of "projector", which may be mapped to the second port based on the second port of a media switch according to an appropriate mapping between ports and devices. The same process can be applied to actions received by other types of input devices.

In some embodiments, the server 102 can be configured to further interpret the user action from additional data produced by other input devices. For example, a first camera may capture that a user is touching a first I/O device with one hand and pointing in a certain direction with the other hand. A second camera may capture a group of I/O devices located along that certain direction. Therefore, the server 102 can be configured to select one among the group of I/O devices and connect the first I/O device with the selected I/O device. For further example, a microphone may capture a first user's speech referring to a media source while a camera may capture a second user's gesture referring to an output device at the same time. Therefore, the server 102 can be configured to prepare an instruction for a media switch to connect the media source with the output device, as further discussed below. In general, in response to a user command that is considered ambiguous or unrecognizable due to a low confidence score, the server 102 can be programmed to solicit additional user input or proceed based on predetermined data or rules, as noted above.

In some embodiments, the server 102 is programmed to cause connection of at least an input device and an output device. The server 102 can be programmed to receive certain data produced by the output device and simply transmit the certain data to the output device, thereby establishing connection. In other embodiments, the server 102 can be programmed to transmit an instruction for a connection to a media switch into which the input device and the output devices are plugged. The media switch is configured to, upon receiving the instruction, open the communication path between the input device and the output device such that specific data is transmitted from the input device to the output device, thereby establishing the connection. In additional embodiments, the server 102 can be plugged into the media switch serving as an input device to the media switch. Specifically, the server 102 can be programmed to convert particular data into a particular format compatible with the communication interface supported by the media switch and transmit the converted data with a specification of a particular output device also plugged into the media switch (or a corresponding port) to the media switch. The media switch is configured to, upon receiving the converted data and the specification, open the communication path between the server 102 and the particular output device such that the converted data is transmitted to the particular output device.

In some embodiments, the server 102 is programmed to continuously learn from activities in the physical room, including issued user commands, to improve the ability to recognize future user commands or automatically turn on, off, up, or down or connect or disconnect the I/O devices. As users repeat existing approaches of referring to an I/O device or requesting for a connection between two I/O devices, the server 102 can be configured to expand the training data. For example, as one or more users pronounce the word of "Sony" as a handle for the SONY® headphone WH-CH700N, such pronunciations can be used as additional training data. For a new approach of referring to an I/O device or requesting for a connection between two I/O devices, the server 102 can be configured to obtain an alternative expression using existing approaches. For example, when a user clarifies that the spoken words of "favorite headset" refers to the SONY® headphone WH-CH700N with an existing handle of the spoken word of "700", the server 102 can be configured to add "favorite headset" as a second existing handle for that I/O device. The server 102 can also be configured to infer the meaning of a new approach when clues are available. For example, when a user says "Connect those two devices" and also makes a clapping gesture at or near the same time, the server 102 can be configured to add the clapping gesture as an additional indication of connecting those two devices or other I/O devices. In addition, based on a history of how the I/O devices are connected, the server can be programmed to establish additional default rules. For example, a first I/O device that is most often connected with a second I/O device can be a default device to connect with the first I/O device. A mechanism that is most often used to refer to an I/O device to connect with a specific I/O device, such as "the I/O device closest to the specific I/O device", can be the default rule used to infer the I/O device to connect with the specific I/O device.

5. Example Processes

Figure 5:
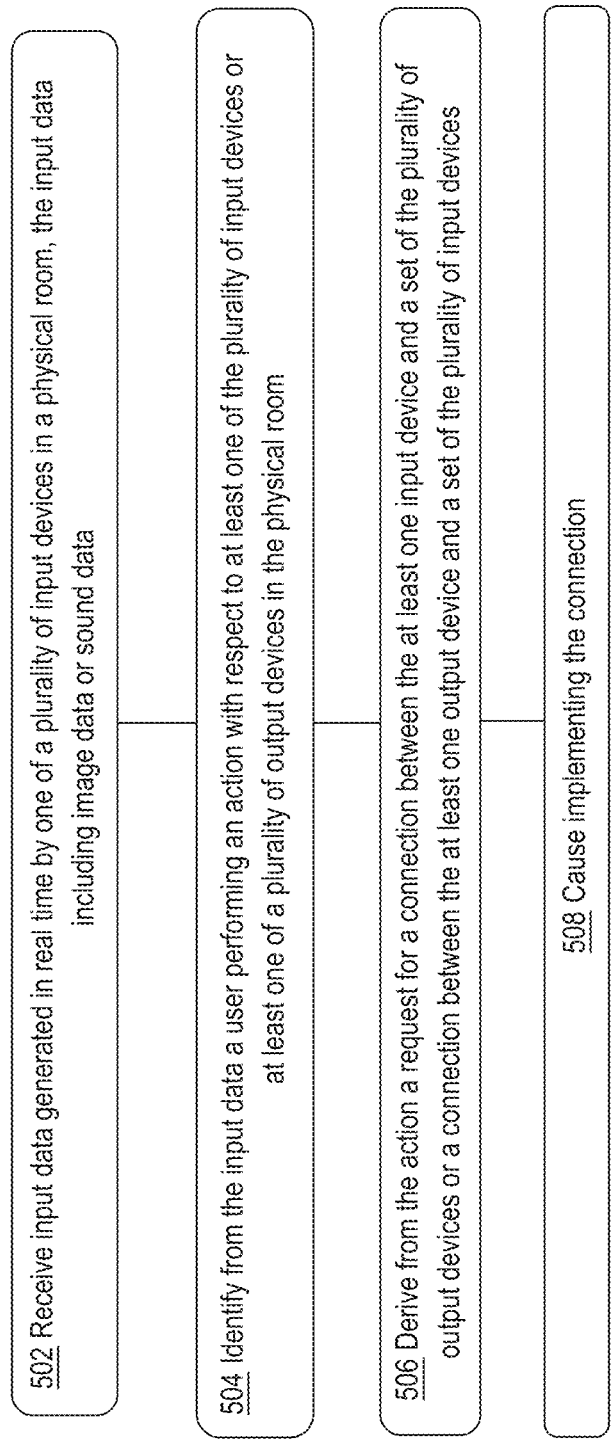
FIG. 5 illustrates an example process performed by the device management server computer of managing multiple devices in a physical room with multimedia communications.

FIG. 5 discussed below is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 5 illustrates an example process performed by the device management server computer of managing multiple devices in a physical room with multimedia communications. In some embodiments, the server 102 is programmed or configured to obtain device data regarding a new (I/O) device in a physical room. The device data can include a handle for the new I/O device, such as a spoken word or a gesture different from an identifier of the new I/O device provided by a vendor of the new I/O device. The device data can further include a default compatible device, a set of collaborating devices, or a hierarchical rank among a set of I/O devices in the physical room.

In some embodiments, in step 502, the server 102 is programmed or configured to receive input data generated in real time by one of a plurality of input devices in the physical room, where the input data includes image data or sound data capturing what is happening in the physical room.

In some embodiments, in step 504, the server 102 is programmed or configured to identify from the input data a user performing an action with respect to at least one of the plurality of input devices or at least one of a plurality of output devices in the physical room. The server 102 can be programmed to extract from the input data a mechanism for a relative reference to a certain I/O device and map the mechanism to the at least one input devices or the at least one output devices. The mechanism can include touching the certain I/O device, looking or pointing at the certain I/O device, looking or pointing in the direction leading to the certain I/O device, describing a positional relationship of the certain I/O device to a portion of the physical room, or describing an attribute of the certain I/O device other than an identifier of the certain I/O device.

In some embodiments, in step 506, the server 102 is programmed or configured to derive from the action a request for a connection between the at least one input devices and a set of the plurality of output devices or a connection between a set of the plurality of input devices and the at least one output devices.

In some embodiments, the server 102 can be programmed to first determine whether the action includes an indication to connect I/O devices. The server 102 can be further programmed to, in response to determining that the action includes an indication to connect I/O devices, determine that the action includes a reference to only to a first I/O device of the plurality of input devices and the plurality of output devices and select a second I/O device of the plurality of input devices and the plurality of output devices to connect with the first I/O device for the request.

In some embodiments, the server 102 can be further programmed to, in response to determining that the action does not include an indication to connect I/O devices, determine whether the action includes references to two I/O devices that can be connected only with each other. The server 102 can be further configured to, in response to determining that the action includes references to more than two I/O devices that can be connected with one another, select at least one connection each between a pair of the more than two I/O devices for the request.

In some embodiments, in deriving from the action a request for a connection between the at least one input devices and the set of the plurality of output devices or a connection between the set of the plurality of input devices and the at least one output devices, the server 102 can be configured to automatically include in the set of input devices or the set of output devices an I/O device that is an only operational input device or only operational output device, that is located closest to a majority of participants in the physical room, that has a best or only capability for handling data being communicated through the connection, or that is a most compatible I/O device to one of the at least one input device or at least one output device.

In some embodiments, in step 508, the server 102 is programmed or configured to cause implementing the connection. The server 102 can be programmed to receive data from one of the at least one input devices or the set of input devices and transmitting the data to one of the set of output devices or the at least one output devices. Alternatively, the server 102 can be programmed to transmit an instruction to a media switch to establish the connection.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
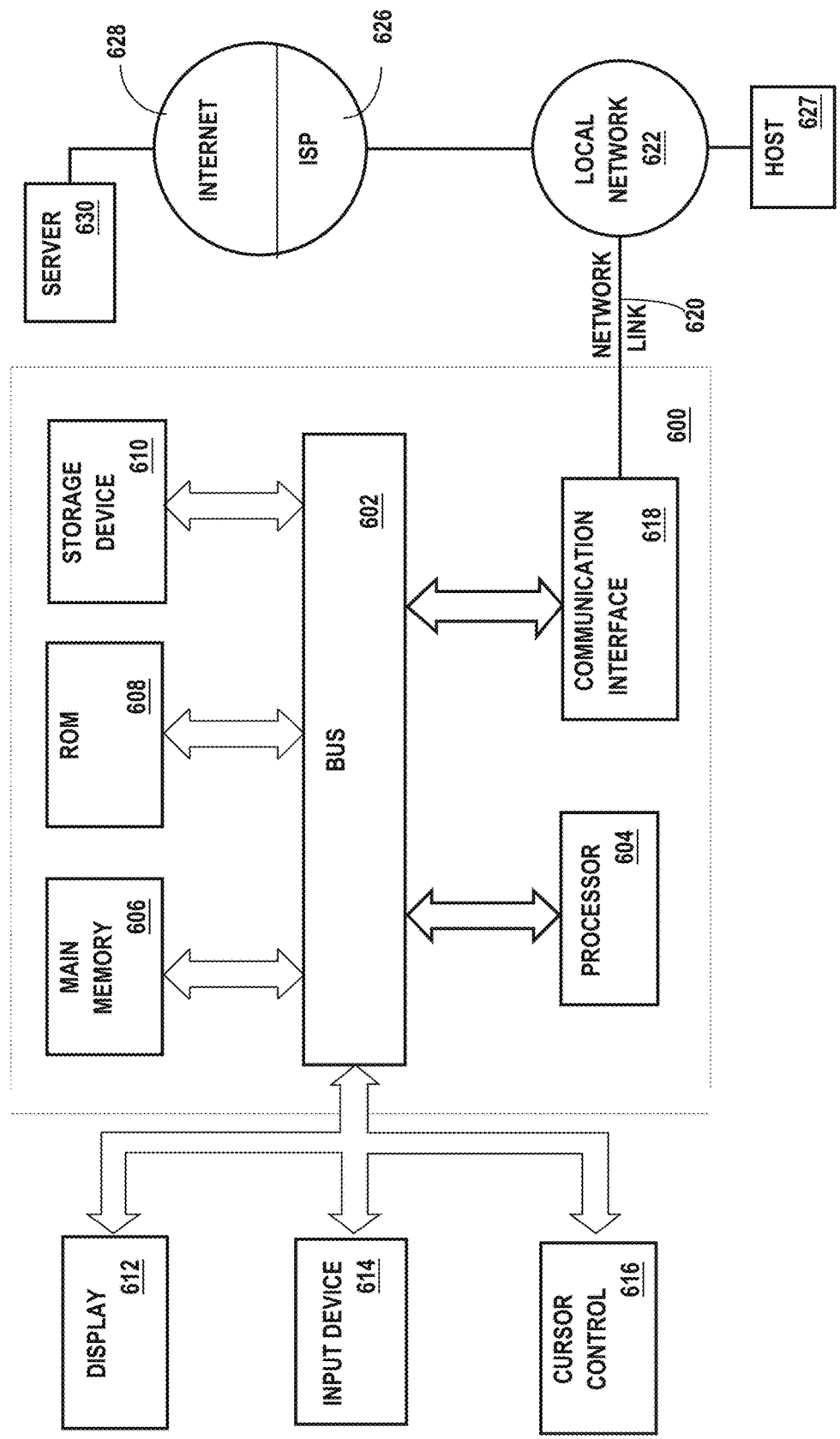
FIG. 6 is a block diagram that illustrates a computer system upon which an embodiment of the invention may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0. Extensions And Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer-implemented method of managing multiple devices in a physical room with multimedia communications in real time, comprising:
receiving and storing, by a processor, input data generated in real time by an input device of a plurality of input devices in a physical room,
the input data including digital image data or digital sound data depicting a user in the physical room performing an action with respect to at least one input device of the plurality of input devices or at least one output device of a plurality of output devices in the physical room;
determining in real time whether the input data indicates an explicit reference to a first input/output (I/O) device of the at least one input device or the at least one output device;
associating, in response to determining that the input data indicates an explicit reference to the first I/O device, the action with a handle for the first I/O device;
identifying, in response to determining that the input data does not indicate an explicit reference to an I/O device, a relative reference to a second I/O device;
determining that the input data indicates forming a connection of I/O devices;
identifying a third I/O device to be connected with the first I/O device or the second I/O device;
automatically establishing a direct or network connection between the first I/O device and the third I/O device or between the second I/O device and the third I/O device in real time;
automatically turning on or off a certain I/O device in the physical room when the certain I/O device is a last I/O device that is turned on, is an only I/O device of a device class in the physical room that can be turned on, has been turned on or off for a given period of time, is most compatible for a given I/O device, is most qualified for a given task, is closest to a given corner of the physical room or a given location of a group of individuals in the physical room.

2. The computer-implemented method of claim 1, the determining in real time whether the input data indicates an explicit reference comprising:
identifying first candidate sounds or first candidate gestures from the input data;
selecting second candidate sounds having a certain auditory similarity to the first candidate sounds or second candidate gestures having a certain visual similarity to the first candidate gestures;
causing a presentation of the first candidate sounds and the second candidate sounds or the first candidate gestures and the second candidate gestures to the user.

3. The computer-implemented method of claim 1,
the determining in real time whether the input data indicates an explicit reference to the first I/O device comprising identifying a handle to the first I/O device,
the handle to the first I/O device including a spoken word or a gesture as a shorthand name for the first I/O device different from an identifier provided by a vendor of the first I/O device.

4. The computer-implemented method of claim 1, the relative reference to the second I/O device including touching the second I/O device, looking or pointing at the second I/O device, looking or pointing in a direction leading to the second I/O device, describing a positional relationship of the second I/O device to a portion of the physical room or an individual in the physical room, or describing an attribute other than an identifier of the second I/O device.

5. The computer-implemented method of claim 1, the input data indicating forming a connection of I/O devices including spoken words related to connect or hook up, gestures of brining two items together, or two references to I/O devices within a period of time.

6. The computer-implemented method of claim 1, further comprising:
ranking the plurality of input devices and the plurality of output devices;
ranking a group of individuals including individuals in the physical room;

the third I/O device being identified based on a rank of each I/O device in the physical room or a rank of the user.

7. The computer-implemented method of claim 1, the third I/O device being a default compatible device or an only compatible device that is turned on for the first I/O device or second I/O device.

8. The computer-implemented method of claim 1, further comprising:
receiving device data comprising user guides, manuals, technical specifications, or data sheets;
identifying device attributes using text analysis techniques, including named entity recognition.

9. The computer-implemented method of claim 1, the automatically establishing comprising:
receiving data from one input device of the at least one input device;
transmitting the data to one output device of the at least one output device.

10. The computer-implemented method of claim 1, the automatically establishing comprising transmitting an instruction to a media switch to establish the direct or network connection.

11. One or more non-transitory storage media storing instructions which, when executed by one or more computing devices, cause performance of a method of managing multi-role activities in a physical room with multimedia communications in real time, the method comprising:
receiving and storing input data generated in real time by an input device of a plurality of input devices in a physical room,
the input data including digital image data or digital sound data depicting a user in the physical room performing an action with respect to at least one input device of the plurality of input devices or at least one output device of a plurality of output devices in the physical room;
determining in real time whether the input data indicates an explicit reference to a first input/output (I/O) device of the at least one input device or the at least one output device;
associating, in response to determining that the input data indicates an explicit reference to the first I/O device, the action with a handle for the first I/O device;
identifying, in response to determining that the input data does not indicate an explicit reference to an I/O device, a relative reference to a second I/O device;
determining that the input data indicates forming a connection of I/O devices;
identifying a third I/O device to be connected with the first I/O device or the second I/O device;
automatically establishing a direct or network connection between the first I/O device and the third I/O device or between the second I/O device and the third I/O device in real time;
automatically turning on or off a certain I/O device in the physical room when the certain I/O device is a last I/O device that is turned on, is an only I/O device of a device class in the physical room that can be turned on, has been turned on or off for a given period of time, is most compatible for a given I/O device, is most qualified for a given task, is closest to a given corner of the physical room or a given location of a group of individuals in the physical room.

12. The one or more non-transitory storage media of claim 11, the determining in real time whether the input data indicates an explicit reference comprising:
identifying first candidate sounds or first candidate gestures from the input data;
selecting second candidate sounds having a certain auditory similarity to the first candidate sounds or second candidate gestures having a certain visual similarity to the first candidate gestures;
causing a presentation of the first candidate sounds and the second candidate sounds or the first candidate gestures and the second candidate gestures to the user.

13. The one or more non-transitory storage media of claim 11,
the determining in real time whether the input data indicates an explicit reference to the first I/O device comprising identifying a handle to the first I/O device,
the handle to the first I/O device including a spoken word or a gesture as a shorthand name for the first I/O device different from an identifier provided by a vendor of the first I/O device.

14. The one or more non-transitory storage media of claim 11, the relative reference to the second I/O device including touching the second I/O device, looking or pointing at the second I/O device, looking or pointing in a direction leading to the second I/O device, describing a positional relationship of the second I/O device to a portion of the physical room or an individual in the physical room, or describing an attribute other than an identifier of the second I/O device.

15. The one or more non-transitory storage media of claim 11, the input data indicating forming a connection of I/O devices including spoken words related to connect or hook up, gestures of brining two items together, or two references to I/O devices within a period of time.

16. The one or more non-transitory storage media of claim 11, the method further comprising:
ranking the plurality of input devices and the plurality of output devices;
ranking a group of individuals including individuals in the physical room;
the third I/O device being identified based on a rank of each I/O device in the physical room or a rank of the user.

17. The one or more non-transitory storage media of claim 11, the third I/O device being a default compatible device or an only compatible device that is turned on for the first I/O device or second I/O device.

18. The one or more non-transitory storage media of claim 11, the automatically establishing comprising:
receiving data from one input device of the at least one input device;
transmitting the data to one output device of the at least one output device.

* * * * *